United States Patent [19]

Lucas

[11] Patent Number: 5,519,104
[45] Date of Patent: May 21, 1996

[54] 1-COMPONENT ALKOXY CURING RTV SILICONE SEALANT COMPOSITIONS HAVING EXTENDED TOOLING TIMES

[75] Inventor: Gary M. Lucas, Scotia, N.Y.

[73] Assignee: General Electric Company, Waterford, N.Y.

[21] Appl. No.: 414,895

[22] Filed: Mar. 31, 1995

[51] Int. Cl.$^6$ ..................................................... C08G 77/08
[52] U.S. Cl. .............................. 528/18; 528/901; 528/34; 524/731; 524/863; 524/266
[58] Field of Search .............................. 528/18, 901, 34; 524/731, 863, 266

[56] References Cited

U.S. PATENT DOCUMENTS

| | | | |
|---|---|---|---|
| 4,417,042 | 11/1983 | Dziark | 528/18 |
| 4,483,973 | 11/1984 | Lucas et al. | 528/21 |
| 4,505,209 | 3/1985 | Strohmeyer, Jr. | 110/245 |
| 4,515,932 | 5/1985 | Chung | 528/16 |
| 4,528,324 | 7/1985 | Chung et al. | 524/863 |
| 4,528,353 | 7/1985 | Lucas et al. | 528/21 |
| 4,563,498 | 1/1986 | Lucas | 524/788 |
| 4,593,085 | 6/1986 | Lucas | 528/18 |
| 4,670,532 | 6/1987 | Lucas | 528/18 |
| 4,755,578 | 7/1988 | Lucas | 528/17 |
| 4,895,918 | 1/1990 | Lucas | 528/18 |
| 5,166,296 | 11/1992 | Wengrovius et al. | 528/18 |

Primary Examiner—Margaret W. Glass

[57] ABSTRACT

A room temperature vulcanizing alkoxy curing silicone composition cured by a dual catalyst system comprising either $(C_4H_9)Sn(O_2CCH_3)(O_2C(CH_2)_{10}CH_3)$ or an approximately equimolar mixture of dibutyltin diacetate and dibutyltin dilaurate or mixtures thereof whereby tooling time is increased without deleterious effects upon cured performance properties.

10 Claims, No Drawings

1-COMPONENT ALKOXY CURING RTV SILICONE SEALANT COMPOSITIONS HAVING EXTENDED TOOLING TIMES

FIELD OF THE INVENTION

The present invention relates to one-component alkoxy curing room temperature vulcanizable silicone sealant compositions that possess extended tooling times

BACKGROUND OF THE INVENTION

Tooling time is a measure of the surface cure time of a room temperature vulcanizable silicone sealant. It is measured from the time the sealant composition is extruded from the caulking gun with initial exposure to atmospheric moisture to when a thin surface skin of cured RTV silicone sealant has formed. Tooling the sealant after a skin has formed gives a mottled, rough and usually unacceptable appearance to the sealant. Sealants with tooling times below about five minutes must be applied in short time periods using short bead lengths and must be tooled or smoothed almost immediately. Sealants with extended tooling times of about ten minutes or more offer the user the advantage of being able to apply long bead lengths that enable the applier to apply complete or long bead lengths enabling the applier to completely seal the joints around a window or door for example while still possessing sufficient time to tool the sealant bead thereby rendering a smooth aesthetically pleasing surface to the sealant.

It has been well-known that various metal chelates may be used as condensation catalysts for alkoxy cure RTV silicone rubber compositions. Beers, U.S. Pat. No. 4,100,129 discloses a basic system of a silanol end-stopped polymer, a polyalkoxy silane crosslinking agent, and a titanium chelate condensation cure catalyst. Such a composition does have the advantage of long tooling or working times along with a tough elastomeric character and excellent primerless adhesion. However, these compositions are relatively slow to cure and cannot be rendered colorless or translucent due to the presence of the yellow titanium compound that catalyzes the condensation cure. Thus coloring agents, pigments and opaque fillers are necessary in this type formulation to mask the unwanted color imparted by the titanium catalyst.

Wengrovius and Lucas, U.S. Pat. No. 5,166,296 disclose the use of dibutyl tin diketonate complexes as condensation cure catalysts for alkoxy curing RTV silicone rubbers and elastomers. A preferred diketone as the diketonate radical is 2,4 pentanedione or acetylacetone, sometimes also referred to as Acac. Alkoxy curing RTV's catalyzed by dibutyltin acetylacetonate generally possess tooling times of ten minutes or more and provide a tough elastomeric sealant composition that also possess good adhesion.

The use of diketonate complexes as condensation cure catalysts in RTV silicone rubber formulations presents a new problem only recently recognized in terms of possible hazards to human health. The Environmental Protection Agency has recently issued a Significant New Use Rule covering 2,4-pentanedione labeling the compound a potential neurotoxin, mutagen, and inhalation toxin. This categorization essentially prohibits the use of 2,4-pentanedione in consumer products. Other non-toxic beta-diketones may be substituted for the 2,4-pentanedione. Such substitutes include among others: 2,2,6,6-tetramethyl-3,5-heptanedione, 1,1,1-trifluoro-2,4-pentanedione, 1-phenyl-1,3-butanedione, 2,4-hexanedione, and 5,7 nonanedione. These compounds are either not available in the commercial quantities that are required for the manufacture of RTV sealants or their use in a sealant formulation would render the sealant composition prohibitively expensive.

Prior to the present invention, it has been well-known that various metal salts of carboxylic acids can be used a condensation catalysts for alkoxy functional RTV silicone rubber compositions. U.S. Pat. Nos. 4,593,085; 4,670,532; 4,755,578; 4,895,918; 4,505,209; 4,563,498; 4,593,085; 4,483,973; 4,528,353; 4,515,932; and 4,528,324 disclose the use of single dialkyl tin dicarboxylates as condensation cure catalysts for alkoxy functional 1-part RTV's. In the cure systems disclosed and taught in these references, dibutyltin diacetate is particularly preferred. It has not been possible using only a single alkyltin dicarboxylate compound as the condensation cure catalyst to simultaneously achieve a long tooling time, a fast property development, a tough elastomeric character, an excellent primerless adhesion, and translucent colorless appearance.

SUMMARY OF THE INVENTION

The present invention relates to room temperature vulcanizable silicone compositions that are based on an alkoxy silicone sealant formulation and that have extended tooling times. More particularly, the present invention relates to the discovery of 1-component, colorless, translucent, alkoxy curing room temperature vulcanizable (RTV) silicones (RTV's) that rapidly cure to tough elastomers, possess excellent primerless adhesion, and offer the user a prolonged tooling during sealant application. By prolonged tooling time applicant means open time or work time. Such RTV sealants are comprised of:

(a) a polyalkoxysilane endcapped dimethyl silicone polymer;

(b) a reinforcing fumed silica filler:

(c) polydimethylsiloxane (PDMS) plasticizing fluids;

(d) alkoxy silane crosslinker;

(e) adhesion promoting organo-functional alkoxy silanes; and (f) a synergistic combination of two tin condensation catalysts selected from the class of $R_2Sn(dicarboxylate)$ complexes. Preferably the synergistic combination of the two catalysts is used in a 1:1 molar ratio of the two tin compounds. More preferably the two tin compounds are dibutyltin diacetate and dibutyltin dilaurate. The R group of the tin condensation catalyst is selected from the group of 1 to 12 carbon atom alkyl groups.

The present invention provides for a catalyst for the condensation curing of alkoxy curing room temperature vulcanizable silicone compositions consisting of $(C_4H_9)_2Sn(O_2CCH_3)(O_2C(CH_2)_{10}CH_3)$. The present invention further provides for a dual catalyst system for the condensation curing of alkoxy curing room temperature vulcanizable silicone compositions consisting of a mixture of dibutyltin diacetate and dibutyltin dilaurate and also a catalyst system wherein the dibutyltin diacetate and the dibutyltin dilaurate are present in approximately equimolar quantities. The present invention provides for a single condensation cure catalyst that substitutes for the dual catalyst.

Having provided for a condensation cure catalyst system the present invention also provides for a general room temperature vulcanizing alkoxy curing silicone composition comprising:

(a) 100 parts by weight of a polyalkoxy terminated polyorganosiloxane having the following formula:

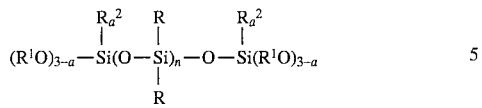

where each R and $R^2$ independently a monovalent one to fifteen carbon hydrocarbon radical, $R^1$ is either a one to eight carbon monovalent organic radical selected from the group consisting of alkyl radicals, alkyl ether radicals, alkylketone radicals, and alkylcyano radicals or a seven to thirteen aralkyl radical; and wherein n is a whole number ranging from about 50 to about 2500; and a is either 0 or 1;

(b) from about 5 to about 25 parts by per 100 parts by weight of weight of polymer (a) of a reinforcing fumed or pyrogenic silica filler;

(g) from about 0.5 to about 8.0 parts by weight per 100 parts by weight of polymer (a) of a stabilizing disilazane or polysilazane hydroxy scavenging agent;

(h) from about 0.10 to about 1.0 parts by weight per 100 parts by weight of polymer (a) of an epoxysilane adhesion promoter having the formula:

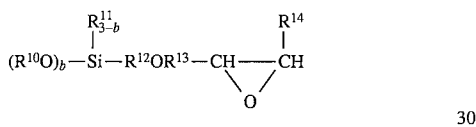

where $R^{10}$ and $R^{11}$ are monovalent one to eight carbon atom hydrocarbon radicals, $R^{12}$ and $R^{13}$ are divalent two to twelve carbon atom hydrocarbon radicals, $R^{14}$ is selected from the group consisting of hydrogen and monovalent one to eight carbon hydrocarbon radicals, preferably hydrogen, and b varies from 1 to 3;

(j) a dual condensation cure catalyst system consisting of an approximately equimolar mixture of dibutyltin diacetate and dibutyltin dilaurate wherein the dibutyltin diacetate is present in an amount ranging from about 0.08 to about 0.14 parts by weight per hundred parts by weight of polymer (a) and wherein the dibutyltin dilaurate is present in an amount ranging from about 0.175 to about 0.25 parts by weight per 100 parts by weight of polymer (a) subject to the limitation that the molar ratio of dibutyltin diacetate to dibutyltin dilaurate present in the composition is one or less.

The present invention also provides for a specific room temperature vulcanizing alkoxy curing silicone composition consisting essentially of:

a) 100 parts by weight of a polyalkoxy terminated polyorganosiloxane having the following formula:

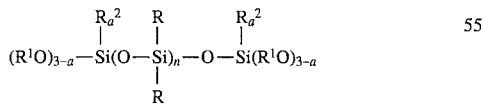

where each R and $R^2$ is independently a monovalent one to fifteen carbon hydrocarbon radical, $R^1$ is either a one to eight carbon monovalent organic radical selected from the group consisting of alkyl radicals, alkyl ether radicals, alkylketone radicals, and alkylcyano radicals or a seven to thirteen aralkyl radical; and wherein n is a whole number ranging from about 50 to about 2500; and a is either 0 or 1;

(b) from about 5 to about 25 parts by per 100 parts by weight of weight of polymer (a) of a reinforcing fumed or pyrogenic silica filler;

(c) from slightly more than zero to about 2 parts by weight per 100 parts by weight of polymer (a) of a cyanofunctional polyalkoxy silane processing aid having the formula:

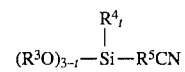

where each $R^3$ and $R^4$ is independently a monovalent one to eighteen carbon atom hydrocarbon radical, $R^5$ is a divalent two to twelve carbon atom hydrocarbon radical, and t ranges from 0 to 3;

(d) from slightly more than zero to about 50 parts by weight per 100 parts by weight of polymer (a) of a tri-organosilyl endstopped diorganopolysiloxane having a viscosity of from 10 to 5,000 centipoise at 25° C. and wherein the organic groups of the endstopping radical are monovalent hydrocarbon radicals having from 1 to about 8 carbon atoms;

(e) from slightly more than zero to about 25 parts by weight per 100 parts by weight of polymer (a) of an MDT silanol fluid consisting essentially of:
(i) from about 1 to about 80 mole percent monoorganosiloxy units;
(ii) from about 0.55 to about 50 mole percent tri-organosiloxy units;
(iii) from about 1 to about 80 mole percent of diorganosiloxy units; and
(iv) from 0 to about 25 mole percent siloxy units; wherein the organo groups of the MDT fluid are monovalent hydrocarbon radicals having from 1 to 10 carbon atoms;

(f) from slightly more than zero to about 5 parts by weight per 100 parts by weight of polymer (a) of a polyalkoxy silane crosslinking agent having the formula:

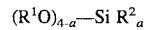

where $R^1$ is either a one to eight carbon monovalent organic radical selected from the group consisting of alkyl radicals, alkyl ether radicals, alkylketone radicals, and alkylcyano radicals or a seven to thirteen aralkyl radical, $R^2$ is a monovalent one to fifteen carbon hydrocarbon radical, and a is either zero or one;

(g) from about 0.5 to about 8.0 parts by weight per 100 parts by weight of polymer (a) of a stabilizing disilazane or polysilazane hydroxy scavenging agent;

(h) from about 0.10 to about 1.0 parts by weight per 100 parts by weight of polymer (a) of an epoxysilane adhesion promoter having the formula:

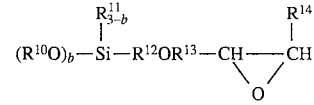

where $R^{10}$ and $R^{11}$ are monovalent one to eight carbon atom hydrocarbon radicals, $R^{12}$ and $R^{13}$ are divalent two to twelve carbon atom hydrocarbon radicals, $R^{14}$ is selected from the group consisting of hydrogen and monovalent one to eight carbon hydrocarbon radicals, preferably hydrogen, and b varies from 1 to 3;

(i) from slightly more than zero to about 3.0 parts by weight per 100 parts by weight of polymer (a) of a polyalkoxysilylalkyl isocyanurate having the formula:

$$(C_3N_3O_3)G_3$$

where the G substituents are each bonded to the nitrogen atoms of the isocyanurate nucleus and G has the formula:

$$(R^{15}O)_{3-u}-\underset{R^{16}{}_u}{Si}-R^{17}-$$

where $R^{15}$ is a monovalent one to eight carbon hydrocarbon radical or cyanoalkylradical, $R^{16}$ is a monovalent one to eight carbon hydrocarbon radical or cyanoalkylradical, and $R^{17}$ is a divalent hydrocarbon radical selected from the group consisting of alkylene, alkylenearylene, cycloalkylene, halogenated alkylene, halogenated alkylenearylene, and halogenated cycloalkylene radicals, and u varies from 0 to 3; and (j) a dual condensation cure catalyst system consisting of an approximately equimolar mixture of dibutyltin diacetate and dibutyltin dilaurate wherein the dibutyltin diacetate is present in an amount ranging from about 0.08 to about 0.14 parts by weight per hundred parts by weight of polymer (a) and wherein the dibutyltin dilaurate is present in an amount ranging from about 0.175 to about 0.25 parts by weight per 100 parts by weight of polymer (a) subject to the limitation that the molar ratio of dibutyltin diacetate to dibutyltin dilaurate present in the composition is one or less.

DETAILED DESCRIPTION OF THE INVENTION

I have discovered that colorless and translucent, alkoxy functional, RTV silicone sealants that simultaneously possess long tooling times, rapid development of tough elastomeric properties, and excellent primerless adhesion can be prepared from polyalkoxy functional polydiorganosiloxanes if a synergistic combination of two dialkyltindicarboxylate condensation cure catalyst is used.

The present invention provides a condensation cure catalyst system comprising two dialkyltindicarboxylate condensation cure catalysts which permit a 1-part alkoxy functional RTV to simultaneously possess a long tooling time, fast elastomeric property development, excellent primerless adhesion, and a translucence free of discoloration, i.e. colorless. The present invention further provides for 1-part alkoxy curing RTV compositions that exhibit long tooling times, fast elastomeric property development, excellent primerless adhesion, and a translucence that is free of discoloration.

Alkoxy functional RTV sealants of the present invention are obtained by combining:

(a) 100 parts by weight of a polyalkoxy terminated polyorganosiloxane having the following formula:

$$(R^1O)_{3-a}-\underset{R_a^2}{Si}(O-\underset{R}{Si})_n-O-\underset{R_a^2}{Si}(R^1O)_{3-a}$$

where each R and $R^2$ is independently a monovalent one to fifteen carbon hydrocarbon radical, $R^1$ is either a one to eight carbon monovalent organic radical selected from the group consisting of alkyl radicals, alkyl ether radicals, alkylketone radicals, and alkylcyano radicals or a seven to thirteen aralkyl radical; n is a whole number ranging from about 50 to about 2500; and a is either 0 or 1. The viscosity of the polymer (a) ranges from about 100 to about 500,000, more preferably from about 5,000 to about 300,000, and most preferably from about 20,000 to about 200,000 centipoise at 25° C. As shown by the above formula and indicated by the subscript a, the terminal silicone atoms of polymer (a) must have at least two alkoxy groups and may have three alkoxy groups.

(b) From about 5 to about 25 parts by weight per 100 parts by weight of polymer (a), preferably from about 9 to about 22, and most preferably from about 15 to about 19 parts by weight per 100 parts by weight of polymer (a) of a reinforcing fumed or pyrogenic silica filler.

(c) Optionally from slightly more than zero to about 2 parts by weight, preferably from about 0.50 to about 1.50, and most preferably from about 0.80 to about 1.20 parts by weight per 100 parts by weight of polymer (a) of a cyano-functional polyalkoxy silane processing aid whereby extrusion rate and thixotropy are improved having the formula:

$$(R^3O)_{3-t}-\underset{R^4{}_t}{Si}-R^5CN$$

where each $R^3$ and $R^4$ is independently a monovalent one to eighteen carbon atom hydrocarbon radical, $R^5$ is a divalent two to twelve carbon atom hydrocarbon radical, and t ranges from 0 to 3.

In the formula of the cyano-functional polyalkoxy silane processing aid, (c), $R^3$ and $R^4$ may be alkyl radicals such as methyl, ethyl, propyl and the like; alkenyl radicals such as vinyl, allyl and the like; cycloalkyl radicals such as cyclohexyl, cycloheptyl, and the like; mononuclear aryl radicals such as methyl phenyl, ethylphenyl, propylphenyl, isopropylphenyl and the like; and fluorine substituted fluoralkyl radicals one non-limiting example being 1,1,1-trifluoropropyl radical. Preferably $R^3$ and $R^4$ are methyl and ethyl, most preferably methyl. $R^5$ is preferably an alkylene or an arylene substituted divalent hydrocarbon radical having from 2 to 12 carbon atoms and most preferably having from 2 to 8 carbon atoms.

The most preferred cyano-functional polyalkoxy silane is 2-cyanoethyltrimethoxysilane; other preferred compounds are:

3-(cyanoethoxy)-3-methylbutenyltrimethoxysilane
2-cyanoethylmethyldimethoxysilane
2-cyanoethyltriethoxysilane
2-cyanopropyltrimethoxysilane
2-cyanoethylmethyldiethoxysilane
3-cyanopropyltriethoxysilane
1-cyanoethyltris(methoxyethoxy)silane.

(d) Optionally from about slightly more than zero to about 50 parts by weight per hundred parts by weight of polymer (a), more preferably from about 10 to about 30 parts by weight, and most preferably from about 15 to about 25 parts by weight per 100 parts by weight of polymer (a) of a tri-organosilyl endstopped diorganopolysiloxane having a viscosity of from 10 to 5000 centipoise (cps) at 25° C. where the organic groups of the endstopping radical are monovalent hydrocarbon radicals, preferably having from 1 to about 8 carbon atoms, as a plasticizer. Preferably such plasticizers are free or essentially free of silanol groups, however, there may be present silanol groups in an amount up to about 500 ppm. It is also preferred that the organo groups are methyl radicals and that the viscosity ranges from 15 to 1000 cps and most preferably from about 20 to about 200 cps.

(e) Optionally from about slightly more than zero to about 25 parts by weight per 100 parts by weight of polymer (a), more preferably from about 5 to about 15 and most preferably from about 7 to about 13 parts by weight per 100 parts by weight of polymer (a) of an MDT silanol fluid comprising:
  (i) from about 1 to about 80, preferably from about 10 to about 70, and most preferably from about 20 to about 60 mole percent mono-organosiloxy units;
  (ii) from about 0.55 to about 50, more preferably from about 5 to about 40, and most preferably from about 10 to about 30 mole percent tri-organosiloxy units;
  (iii) from about 1 to about 80, more preferably from about 10 to about 70, and most preferably from about 20 to about 60 mole percent of diorganosiloxy units; and
  (iv) from 0 to about 25, preferably from 0 to about 5 and most preferably zero mole percent siloxy units.
The organo groups of the MDT fluid are monovalent hydrocarbon radicals having from 1 to 10 carbon atoms, preferably having from 1 to about 5 carbon atoms, more preferably having from 1 to about 3 carbon atoms, and most preferably 1 carbon atom.

(f) Optionally from about slightly more than zero to, about 5 parts by weight per 100 parts by weight of polymer (a), preferably from about 0.5 to about 3.5, and most preferably from about 1.0 to about 2.5 parts by weight per 100 parts by weight of polymer (a) of a polyalkoxysilane crosslinking agent having the formula:

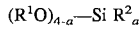

where $R^1$, $R^2$, and a are as previously defined.

(g) From about 0.5 to about 8.0, preferably from about 1.0 to about 6.0, and most preferably from about 2.0 to about 4.0 parts by weight per 100 parts by weight of polymer (a) of a stabilizing disilazane or polysilazane hydroxy scavenger as disclosed by Dziark in U.S. Pat. No. 4,417,042. The preferred hydroxy scavenger is hexamethyldisilazane.

(h) From about 0.10 to about 1.0, more preferably from about 0.2 to about 0.8, and most preferably from about 0.3 to about 0.6 parts by weight per 100 parts by weight of polymer (a) of an epoxysilane adhesion promoter having the formula:

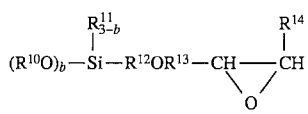

where $R^{10}$ and $R^{11}$ are monovalent one to eight carbon atom hydrocarbon radicals, $R^{12}$ and $R^{13}$ are divalent two to twelve carbon atom hydrocarbon radicals such as for example alkylene, arylene, and alkylarylene radicals, and may be either unsubstituted or substituted with various substituents such as halogen, ether groups, ester groups, and other hydrocarbon groups. $R^{14}$ is selected from the group consisting of hydrogen and monovalent one to eight carbon hydrocarbon radicals, preferably hydrogen, and b varies from 1 to 3. Suitable adhesion promoters defined by the foregoing formula are disclosed in Lucas U.S. Pat. No. 4,483,973 and specific preferred compounds are:
gamma-glycidoxypropylmethyldimethoxysilane
gamma-glycidoxypropyltriethoxysilane
gamma-glycidoxypropylmethyldiethoxysilane
gamma-glycidoxyethyltrimethoxysilane
epoxy-cyclohexylethyltrimethoxysilane
epoxycyclohexylethyltrimethoxysilane.
The most preferred compound gamma-glycidoxypropyltrimethoxysilane.

(i) Optionally from about slightly more than zero to about 3.0, preferably from about 0.3 to about 1.5, and most preferably from about 0.5 to about 1.0 parts by weight per 100 parts by weight of polymer (a) of a polyalkoxysilylalkyl isocyanurate having the formula:

$$(C_3N_3O_3)G_3$$

where the G substituents are each bonded to the nitrogen atoms of the isocyanurate nucleus and G has the formula:

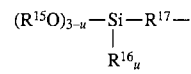

where $R^{15}$ is a monovalent one to eight carbon hydrocarbon radical or cyanoalkylradical, $R^{16}$ is a monovalent one to eight carbon hydrocarbon radical or cyanoalkylradical, and $R^{17}$ is a divalent hydrocarbon radical selected from the group consisting of alkylene, alkylenearylene, cycloalkylene, halogenated alkylene, halogenated alkylenearylene, and halogenated cycloalkylene radicals, and u varies from 0 to 3. Examples of the compounds described by the foregoing formula include:
1,3,5-tris(methyldimethoxysilylpropyl)isocyanurate
1,3,5-tris(methyldiethoxysilylpropyl)isocyanurate
1,3,5-tris(trimethoxysilylpropyl)isocyanurate
1,3,5-tris(trimethethoxysilylethyl)isocyanurate with the most preferred compound being 1,3,5-tris(trimethoxysilylpropyl)isocyanurate.

(j) A dual condensation cure catalyst system consisting of an approximately equimolar mixture of dibutyltin diacetate and dibutyltin dilaurate wherein when the molar ratio is not exactly equimolar the dibutyltin dilaurate is in excess and where the dibutyltin diacetate is present in an amount ranging from about 0.08 to about 0.14 parts by weight per 100 parts by weight of polymer (a) and where the dibutyltin dilaurate is present in an amount ranging from about 0.175 to about 0.25 parts by weight per 100 parts by weight of polymer (a). While both tin compounds may be separately added to the RTV formulation, a preferred method of adding the two catalysts is to mix them together, allowing time for any pre-reaction or trans-esterification if desired, and then add the mixture to the RTV formulation.

All U.S. patents referred to herein are herewith specifically incorporated by reference. Where the word optionally has been used in describing a composition, the level of concentration for the optional component may vary from zero to the desired level specified. By slightly greater than or more than zero, Applicant defines such phrases to mean a measurable non-zero quantity.

EXPERIMENTAL

EXAMPLE 1

Using a 30 mm Werner-Pfliederer twin screw extruder, and RTV composition, composition "A," was produced as follows:

(a) 66 parts by weight of an alpha, omega-methyldimethoxy terminated polydimethylsiloxane polymer having a viscosity of 125,000 cps;

(b) 11 parts by weight of a reinforcing fumed silica filler that had been pre-treated with octamethylcyclotetrasiloxane;

(c) 0.7 parts by weight of cyanoethyltrimethoxysilane processing aid;

(d) 13 parts by weight of an alpha, omega-trimethylsilyl terminated polydimethylsiloxane fluid having a viscosity of 100 cps;

(e) 5 parts by weight of a 50 cps MDT silanol fluid;

(f) 1.5 parts by weight of methyltrimethoxysilane crosslinker;

(g) 2 parts by weight of hexamethyldisilazane;

(h) 0.25 parts by weight of gamma-glycidoxypropyltrimethoxysilane adhesion promoter;

(i) 0.5 parts by weight of 1,3,5-tris(trimethoxysilylpropyl)isocyanurate; and (j) 0.10 parts by weight of dibutyltin diacetate condensation cure catalyst.

Werner-Pfliederer Extruder Mixing Procedure:

All sections of the extruder were heated to 75° C. To barrel 1 on the extruder, there was continuously metered in alpha, omega-methyldimethoxy terminated polydimethylsiloxane polymer having a viscosity of 125,000 cps and reinforcing fumed silica filler that had been pre-treated with octamethylcyclotetrasiloxane. To barrel 3 of the extruder there was continuously metered in a silane pre-blend consisting of hexamethyldisilazane, methyltrimethoxysilane cross-linker, cyanoethyltrimethoxysilane plasticizer, gamma-glycidoxypropyltrimethoxysilane, and 1,3,5-tris(trimethoxysilylpropyl)isocyanurate. To barrel 6 of the extruder there was continuously metered in a second pre-blend consisting of an alpha, omega-trimethylsilyl terminated polydimethylsiloxane fluid having a viscosity of 100 cps and an MDT silanol fluid having a viscosity of 50 cps. To barrel 13 of the extruder there was continuously metered in a pre-blend of an alpha, omega-trimethylsilyl terminated polydimethylsiloxane fluid having a viscosity of 100 cps and dibutyltin diacetate. RTV sealant was produced in the extruder at a rate of 40 lb/hr.

For purposes of comparison additional RTV sealant compositions were prepared in the extruder using the procedure previously described but varying the level of the dibutyltin diacetate:

| RTV Composition | Dibutyltin Diacetate, pbw |
|---|---|
| A | 0.10 |
| B | 0.12 |
| C | 0.14 |
| D | 0.16 |
| E | 0.18 |
| F | 0.20 |

The following tests were performed on RTV compositions A through F to determine the variation of properties with catalyst level in order to determine which level of dibutyltin diacetate produce an RTV sealant having the desired tooling time and cure property performance parameters.

| Test | Minimum Required Values |
|---|---|
| Tooling Time* | 10 minutes |
| WPSTM E-2, Durometer, Shore A | 15 |
| WPSTM E-1 Tensile at Break | 175 psi |
| WPSTM E-1 Elongation at Break | 400% |
| WSPTM C-628 Peel Adhesion | |
| Glass | |
| ppi | 15 |
| % cohesive failure | 90 |
| Bare Aluminum | |
| ppi | 15 |
| % cohesive failure | 90 |
| PVC Plastic | |
| ppi | 15 |
| % cohesive failure | 90 |

*Tooling Time Test Description
All test specimens were cured for 3 days at 72° F. and 50% relative humidity, results are presented in table 1.

½" wide×¼" deep×8" long beads of RTV are extruded onto cardboard squares using a 6 ounce Semco® tube hand caulking gun fitted with a ⅛" aperture plastic nozzle and exposed to 72° F. and 50% relative humidity.

The RTV beads are then hand tooled with a stainless steel spatula at 2 minute time intervals. The tooling time or skin over time is defined as the maximum time interval in which the RTV surface remains smooth and free of imperfections as a result of contact with the spatula.

Table 1 shows that the combination of a tooling time greater than 10 minutes simultaneous with the appearance of minimum cured physical properties cannot be achieved using dibutyltin diacetate as the sole condensation cure catalyst.

EXAMPLE 2

RTV compositions were prepared as in example 1 using the Werner-Pfliederer extruder except that the dibutyltin diacetate catalyst was replaced with dibutyltin dilaurate catalyst. All other component levels remained the same.

| RTV Composition | Dibutyltin Dilaurate, pbw |
|---|---|
| G | 0.20 |
| H | 0.25 |
| I | 0.30 |
| J | 0.35 |
| K | 0.40 |
| F | 0.20 |

Compositions G through K failed to cure after a 48 hour exposure to 72° F. and 50% relative humidity environment. Dibutyltin dilaurate is not a satisfactory condensation cure catalyst for the RTV formulation represented by composition A, components (a) through (i).

EXAMPLE 3

RTV compositions were prepared as in example 1 using the Werner-Pfliederer extruder except that the dibutyltin diacetate catalyst was replaced with dibutyltin diacetate (DBTDA)/dibutyltin dilaurate DBTDL) catalyst combinations as component (j). All other component levels remained the same.

| RTV Composition | DBTDA | DBTDL, pbw |
|---|---|---|
| L | 0.02 | 0.200 |
| M | 0.04 | 0.200 |
| N | 0.06 | 0.200 |
| O | 0.08 | 0.200 |
| P | 0.10 | 0.200 |
| Q | 0.12 | 0.200 |
| R | 0.14 | 0.200 |
| S | 0.16 | 0.200 |
| T | 0.10 | 0.100 |
| U | 0.10 | 0.125 |
| V | 0.10 | 0.150 |
| W | 0.10 | 0.175 |
| X | 0.10 | 0.200 |
| Y | 0.10 | 0.225 |
| Z | 0.10 | 0.250 |

Tests, as previously described, were run on compositions L through Z to determine which combinations of the two catalysts provide sealants having a tooling time greater than 10 minutes and the required cured property performance parameters. The results are listed in table 2. Table 2 shows that in order to obtain a tooling time greater than 10 minutes and simultaneously obtain the cure property performance sought that given the composition of the RTV, the amount of the combined catalyst system must have an amount of dibutyltin diacetate ranging from about 0.08 to about 0.14 parts by weight per 100 parts by weight of polymer (a) and an amount of dibutyltin dilaurate of at least 0.175 parts by weight per 100, parts by weight of polymer (a).

EXAMPLE 4

The example describes the preparation of a mixed dicarboxylate salt of dibutyltin.

351 g of dibutyltin diacetate and 632 g of dibutyltin dilaurate was charged into a suitable reaction vessel, equipped with an agitator and nitrogen purge. The reaction mixture was heated to 75° C. and mixed for 15 hours. The reaction mixture was cooled to 25° C. leaving the finished product. The product was 95% pure $(C_4H_9)_2Sn(O_2CCH_3)(O_2C(CH_2)_{10}CH_3)$ by $Sn^{119}$ nuclear magnetic resonance.

EXAMPLE 5

RTV compositions were prepared using the base composition A substituting $(C_4H_9)_2Sn(O_2CCH_3)(O_2C(CH_2)_{10}CH_3)$ for the dibutyltin diacetate catalyst, component (j). Eleven concentration levels of $(C_4H_9)_2Sn(O_2CCH_3)(O_2C(CH_2)_{10}CH_3)$ were evaluated ranging from 0.20 to 0.40 parts by weight per 100 parts by weight of polymer (a). The test results are listed in Table 3. Table 3 shows that in order to obtain the desired tooling times and cured property performance the level of $(C_4H_9)_2Sn(O_2CCH_3)(O_2C(CH_2)_{10}CH_3)$ must be between 0.28 and 0.36 parts by weight per 100 parts by weight of polymer (a).

EXAMPLE 6

RTV compositions were prepared using the base composition A substituting 0.1 parts by weight of dibutyltin diacetate and 0.2 parts by weight of dibutyltin bis(2-ethylhexoate) for the dibutyltin diacetate catalyst, component (j). This composition failed to cure after a 48 hour exposure to 50% relative humidity at 72° F.

EXAMPLE 7

RTV compositions were prepared using the base composition A substituting 0.1 parts by weight of dibutyltin diacetate and 0.2 parts by weight of dimethyltin di neodecanoate for the dibutyltin diacetate catalyst, component (j). This composition failed to cure after a 48 hour exposure to 50% relative humidity at 72° F.

TABLE 1

| | RTV Compositions Example 1 | | | | | |
|---|---|---|---|---|---|---|
| | A | B | C | D | E | F |
| Tooling Time (minutes) | 30 | 20 | 10 | 7 | 5 | 2 |
| Shore A | <5 | <5 | 8 | 16 | 19 | 22 |
| Tensile, psi | <50 | <50 | 125 | 178 | 210 | 225 |
| Elongation, % | <100 | <100 | 345 | 475 | 505 | 530 |
| Peel Adhesion | | | | | | |
| Glass | 0/0 | 0/0 | 15/25 | 19/50 | 28/75 | 32/100 |
| Aluminum | 0/0 | 0/0 | 13/0 | 18/25 | 25/50 | 29/75 |
| PVC Plastic | 0/0 | 0/0 | 17/50 | 19/50 | 29/75 | 35/100 |

TABLE 2

| | RTV Compositions Example 3 | | | | | | | |
|---|---|---|---|---|---|---|---|---|
| | L | M | N | O | P | Q | R | S |
| Tooling Time (minutes) | NC* | NC | 30 | 25 | 20 | 15 | 10 | 5 |
| Shore A | NC | NC | 5 | 20 | 20 | 20 | 22 | 23 |
| Tensile, psi | NC | NC | 80 | 180 | 261 | 209 | 245 | 235 |
| Elongation, % | NC | NC | 210 | 506 | 504 | 496 | 515 | 523 |
| Peel Adhesion | | | | | | | | |
| Glass | NC | NC | 17/25 | 25/100 | 24/100 | 28/100 | 31/100 | 33/100 |
| Aluminum | NC | NC | 0/0 | 21/100 | 25/100 | 22/90 | 30/90 | 33/100 |
| PVC Plastic | NC | NC | 15/25 | 27/100 | 24/100 | 26/100 | 35/100 | 39/100 |

| | T | U | V | W | X | Y | Z |
|---|---|---|---|---|---|---|---|
| Tooling Time (minutes) | NC | NC | >30 | 20 | 20 | 20 | 20 |
| Shore A | NC | NC | 10 | 18 | 21 | 20 | 21 |
| Tensile, psi | NC | NC | 105 | 217 | 275 | 242 | 237 |

TABLE 2-continued

| RTV Compositions Example 3 | | | | | | | |
|---|---|---|---|---|---|---|---|
| Elongation, % | NC | NC | 245 | 493 | 521 | 501 | 497 |
| Peel Adhesion | | | | | | | |
| Glass | NC | NC | 15/50 | 21/100 | 29/100 | 27/100 | 23/100 |
| Aluminum | NC | NC | 13/0 | 18/90 | 23/90 | 21/100 | 29/90 |
| PVC Plastic | NC | NC | 15/25 | 24/100 | 31/100 | 29/100 | 28/90 |

*NC = no cure

TABLE 3

| RTV Compositions Example 4 | | | | | | |
|---|---|---|---|---|---|---|
| $(C_4H_9)_2Sn(O_2CCH_3)(O_2C(CH_2)_{10}CH_3)$ level, parts by weight/100 parts(a) | 0.20 | 0.22 | 0.24 | 0.26 | 0.28 | 0.30 |
| Tooling Time (minutes) | NC* | NC | NC | 30 | 25 | 20 |
| Shore A | NC | NC | NC | 9 | 19 | 21 |
| Tensile, psi | NC | NC | NC | 117 | 195 | 217 |
| Elongation, % | NC | NC | NC | 304 | 495 | 517 |
| Peel Adhesion | | | | | | |
| Glass | NC | NC | NC | 15/0 | 21/100 | 23/100 |
| Aluminum | NC | NC | NC | 0/0 | 21/90 | 23/90 |
| PVC Plastic | NC | NC | NC | 19/23 | 27/100 | 31/100 |
| $(C_4H_9)_2Sn(O_2CCH_3)(O_2C(CH_2)_{10}CH_3)$ level, parts by weight/100 parts(a) | 0.32 | 0.34 | 0.36 | 0.38 | 0.40 | |
| Tooling Time (minutes) | 15 | 10 | 10 | 5 | 2 | |
| Shore A | 23 | 25 | 26 | 24 | 27 | |
| Tensile, psi | 241 | 247 | 231 | 249 | 243 | |
| Elongation, % | 495 | 529 | 310 | 537 | 541 | |
| Peel Adhesion | | | | | | |
| Glass | 31/100 | 35/100 | 39/100 | 42/100 | 41/100 | |
| Aluminum | 34/100 | 34/100 | 35/100 | 36/100 | 29/90 | |
| PVC Plastic | 39/100 | 41/100 | 41/100 | 43/100 | 40/100 | |

NC = no cure

Thus a dual catalyst system consisting of dibutyltin diacetate and dibutyltin dilaurate or the reaction product of an equimolar amount of these two compounds or the mixed carboxylate salt dibutyltin acetate laurate provides a novel condensation cure catalyst for alkoxy curing RTV silicones that imparts long tooling times and desirable cured property performance to alkoxy cured RTV silicones.

Having described the invention that which is claimed is:

1. A room temperature vulcanizing alkoxy curing silicone composition comprising:

(a) 100 parts by weight of a polyalkoxy terminated polyorganosiloxane having the following formula:

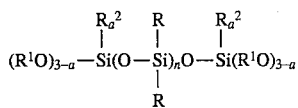

where each R and $R^2$ is independently a monovalent one to fifteen carbon hydrocarbon radical, $R^1$ is either a one to eight carbon monovalent organic radical selected from the group consisting of alkyl radicals, alkyl ether radicals, alkylketone radicals, and alkylcyano radicals or a seven to thirteen aralkyl radical; and wherein n is a whole number ranging from about 50 to about 2500; and a is either 0 or 1;

(b) from about 5 to about 25 parts by per 100 parts by weight of weight of polymer (a) of a reinforcing fumed or pyrogenic silica filler;

(g) from about 0.5 to about 8.0 parts by weight per 100 parts by weight of polymer (a) of a stabilizing disilazane or polysilazane hydroxy scavenging agent;

(h) from about 0.10 to about 1.0 parts by weight per 100 parts by weight of polymer (a) of an epoxysilane adhesion promoter having the formula:

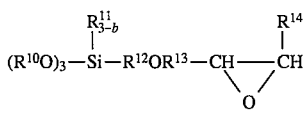

where $R^{10}$ and $R^{11}$ are monovalent one to eight carbon atom hydrocarbon radicals, $R^{12}$ and $R^{13}$ are divalent two to twelve carbon atom hydrocarbon radicals, $R^{14}$ is selected from the group consisting of hydrogen and monovalent one to eight carbon hydrocarbon radicals and b varies from 1 to 3;

(j) a dual condensation cure catalyst system consisting of 1) an approximately equimolar mixture of dibutyltin diacetate and dibutyltin dilaurate wherein the dibutyltin diacetate is present in an amount ranging from about 0.08 to about 0.14 parts by weight per hundred parts by weight of polymer (a) and wherein the dibutyltin dilaurate is present in an amount ranging from about 0.175 to about 0.25 parts by weight per 100 parts by weight of polymer (a) subject to the limitation that the molar ratio of dibutyltin diacetate to dibutyltin dilaurate present in the composition is one or less or 2) from 0.28 to 0.36 parts by weight of polymer (a) of a catalyst of the formula $(CH_4H_9)_2Sn(O_2CCH_3)(O_2C(CH_2)_{10}CH_3)$, whereby tooling time is greater than 10 minutes.

2. The composition of claim 1 further comprising from slightly more than zero to about 3.0 parts by weight per 100 parts by weight of polymer (a) of an isocyanurate having the formula:

$(C_3N_3O_3)G_3$ where the G substituents are each bonded to the nitrogen atoms of the isocyanurate nucleus and G has the formula:

$$(R^{15}O)_{3-u} - \underset{\underset{R^{16}_u}{|}}{Si} - R^{17} - $$

where $R^{15}$ is a monovalent one to eight carbon hydrocarbon radical or cyanoalkylradical, $R^{16}$ is a monovalent one to eight carbon hydrocarbon radical or cyanoalkylradical, and $R^{17}$ is a divalent hydrocarbon radical selected from the group consisting of alkylene, alkylenearylene, cycloalkylene, halogenated alkylene, halogenated alkylenearylene, and halogenated cycloalkylene radicals, and u varies from 0 to 3.

3. The composition of claim 1 further comprising from slightly more than zero to about 2 parts by weight per 100 parts by weight of polymer (a) of a cyano-functional polyalkoxy silane processing aid having the formula:

$$(R^3O)_{3-t} - \underset{\underset{R^4_t}{|}}{Si} - R^5CN$$

where each $R^3$ and $R^4$ is independently a monovalent one to eighteen carbon atom hydrocarbon radical, $R^5$ is a divalent two to twelve carbon atom hydrocarbon radical, and t ranges from 0 to 3; whereby extrusion rate and thixotropy of the composition are improved.

4. The composition of claim 3 wherein the processing aid is 2-cyanoethyl trimethoxysilane.

5. The composition of claim 1 further comprising from slightly more than zero to about 50 parts by weight per 100 parts by weight of polymer (a) of a tri-organosilyl endstopped diorganopolysiloxane having a viscosity of from 10 to 5,000 centipoise at 25° C. and wherein the organic groups of the endstopping radical are monovalent hydrocarbon radicals having from 1 to about 8 carbon atoms whereby the composition is plasticized.

6. The composition of claim 1 further comprising from slightly more than zero to about 25 parts by weight per 100 parts by weight of polymer (a) of an MDT silanol fluid consisting essentially of:
  (i) from about 1 to about 80 mole percent monoorganosiloxy units;
  (ii) from about 0.55 to about 50 mole percent triorganosiloxy units;
  (iii) from about 1 to about 80 mole percent of diorganosiloxy units; and
  (iv) from 0 to about 25 mole percent siloxy units; wherein the organo groups of the MDT fluid are monovalent hydrocarbon radicals having from 1 to 10 carbon atoms.

7. The composition of claim 1 further comprising from slightly more than zero to about 5 parts by weight per 100 parts by weight of polymer (a) of a polyalkoxy silane crosslinking agent having the formula:

$(R^1O)_{4-a} - Si\ R^2_a$ where $R^1$ is either a one to eight carbon monovalent organic radical selected from the group consisting of alkyl radicals, alkyl ether radicals, alkylketone radicals, and alkylcyano radicals or a seven to thirteen aralkyl radical, $R^2$ is a monovalent one to fifteen carbon hydrocarbon radical, and a is either zero or one.

8. The composition of claim 1 wherein the adhesion promoter is gamma-glycidoxypropyltrimethoxysilane.

9. The composition of claim 1 wherein the isocyanurate compound is 1,3,5-tris(trimethoxysilylpropyl)isocyanurate.

10. A room temperature vulcanizing alkoxy curing silicone composition consisting essentially of:
  a) 100 parts by weight of a polyalkoxy terminated polyorganosiloxane having the following formula:

$$(R^1O)_{3-a} - \underset{\underset{R^2_a}{|}}{Si}[O - \underset{\underset{R_2}{|}}{Si}]_n - OSi(R^1O)_{3-a}$$

where each R and $R^2$ is independently a monovalent one to fifteen carbon hydrocarbon radical, $R^1$ is either a one to eight carbon monovalent organic radical selected from the group consisting of alkyl radicals, alkyl ether radicals, alkylketone radicals, and alkylcyano radicals or a seven to thirteen aralkyl radical; and wherein n is a whole number ranging from about 50 to about 2500; and a is either 0 or 1;
  b) from about 5 to about 25 parts by per 100 parts by weight of weight of polymer (a) of a reinforcing fumed or pyrogenic silica filler;
  c) from slightly more than zero to about 2 parts by weight per 100 parts by weight of polymer (a) of a cyanofunctional polyalkoxy silane processing aid having the formula:

$$(R^3O)_{3-t} - \underset{\underset{R^4_t}{|}}{Si} - R^5CN$$

where each $R^3$ and $R^4$ is independently a monovalent one to eighteen carbon atom hydrocarbon radical, $R^5$ is a divalent two to twelve carbon atom hydrocarbon radical, and t ranges from 0 to 3;
  d) from slightly more than zero to about 50 parts by weight per 100 parts by weight of polymer (a) of a tri-organosilyl endstopped diorganopolysiloxane having a viscosity of from 10 to 5,000 centipoise at 25° C. and wherein the organic groups of the endstopping radical are monovalent hydrocarbon radicals having from 1 to about 8 carbon atoms;
  e) from slightly more than zero to about 25 parts by weight per 100 parts by weight of polymer (a) of an MDT silanol fluid consisting essentially of:
    (i) from about 1 to about 80 mole percent monoorganosiloxy units;
    (ii) from about 0.55 to about 50 mole percent triorganosiloxy units;
    (iii) from about 1 to about 80 mole percent of diorganosiloxy units; and
    (iv) from 0 to about 25 mole percent siloxy units; wherein the organo groups of the MDT fluid are monovalent hydrocarbon radicals having from 1 to 10 carbon atoms;
  f) from slightly more than zero to about 5 parts by weight per 100 parts by weight of polymer (a) of a polyalkoxy silane crosslinking agent having the formula:

$(R^1O)_{4-a}-Si\,R^2_a$ where $R^1$ is either a one to eight carbon monovalent organic radical selected from the group consisting of alkyl radicals, alkyl ether radicals, alkylketone radicals, and alkylcyano radicals or a seven to thirteen aralkyl radical, $R^2$ is a monovalent one to fifteen carbon hydrocarbon radical, and a is either zero or one;

(g) from about 0.5 to about 8.0 parts by weight per 100 parts by weight of polymer (a) of a stabilizing disilazane or polysilazane hydroxy scavenging agent;

(h) from about 0.10 to about 1.0 parts by weight per 100 parts by weight of polymer (a) of an epoxysilane adhesion promoter having the formula:

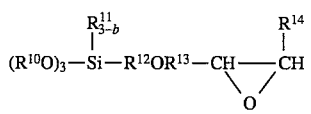

where $R^{10}$ and $R^{11}$ are monovalent one to eight carbon atom hydrocarbon radicals, $R^{12}$ and $R^{13}$ are divalent two to twelve carbon atom hydrocarbon radicals, $R^{14}$ is selected from the group consisting of hydrogen and monovalent one to eight carbon hydrocarbon radicals and b varies from 1 to 3;

(i) from slightly more than zero to about 3.0 parts by weight per 100 parts by weight of polymer (a) of a polyalkoxysilylalkyl isocyanurate having the formula:

$(C_3N_3O_3)G_3$ where the G substituents are each bonded to the nitrogen atoms of the isocyanurate nucleus and G has the formula:

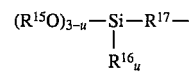

where $R^{15}$ is a monovalent one to eight carbon hydrocarbon radical or cyanoalkylradical, $R^{16}$ is a monovalent one to eight carbon hydrocarbon radical or cyanoalkylradical, and $R^{17}$ is a divalent hydrocarbon radical selected from the group consisting of alkylene, alkylenearylene, cycloalkylene, halogenated alkylene, halogenated alkylenearylene, and halogenated cycloalkylene radicals, and u varies from 0 to 3; and (j) a dual condensation cure catalyst system consisting of 1) an approximately equimolar mixture of dibutyltin diacetate and dibutyltin dilaurate wherein the dibutyltin diacetate is present in an amount ranging from about 0.08 to about 0.14 parts by weight per hundred parts by weight of polymer (a) and wherein the dibutyltin dilaurate is present in an amount ranging from about 0.175 to about 0.25 parts by weight per 100 parts by weight of polymer (a) subject to the limitation that the molar ratio of dibutyltin diacetate to dibutyltin dilaurate present in the composition is one or less or 2) from 0.28 to 0.36 parts by weight per 100 parts by weight of polymer (a) of a catalyst of the formula $(C_4H_9)_2Sn(O_2CCH_3)(O_2C(CH_2)_{10}CH_3)$, whereby tooling time is greater than 10 minutes.

* * * * *